United States Patent
Chakravarthy

(10) Patent No.: US 10,929,482 B2
(45) Date of Patent: *Feb. 23, 2021

(54) UNIFIED PUBLICATION SEARCH AND CONSUMPTION INTERFACE

(71) Applicant: Amazon Technologies, Inc., Seattle, WA (US)

(72) Inventor: Diwakar Chakravarthy, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 587 days.

This patent is subject to a terminal disclaimer.

(21) Appl. No.: 15/478,081

(22) Filed: Apr. 3, 2017

(65) Prior Publication Data

US 2017/0206275 A1    Jul. 20, 2017

Related U.S. Application Data

(63) Continuation of application No. 12/790,672, filed on May 28, 2010, now Pat. No. 9,613,103.

(51) Int. Cl.
| | | |
|---|---|---|
| G06F 16/95 | (2019.01) |
| G06F 16/951 | (2019.01) |
| G06F 16/25 | (2019.01) |
| G06F 16/28 | (2019.01) |
| G06F 16/2455 | (2019.01) |
| G06F 16/2458 | (2019.01) |
| G01C 21/36 | (2006.01) |

(52) U.S. Cl.
CPC ......... *G06F 16/951* (2019.01); *G01C 21/362* (2013.01); *G06F 16/2455* (2019.01); *G06F 16/2471* (2019.01); *G06F 16/252* (2019.01); *G06F 16/283* (2019.01)

(58) Field of Classification Search
CPC ............. G06F 16/2455; G06F 16/2471; G06F 16/252; G06F 16/283; G06F 16/951
See application file for complete search history.

(56) References Cited

U.S. PATENT DOCUMENTS

| | | | |
|---|---|---|---|
| 6,178,418 B1 | 1/2001 | Singer | |
| 6,484,149 B1 * | 11/2002 | Jammes | G06Q 30/02 705/26.62 |

(Continued)

*Primary Examiner* — Merilyn P Nguyen
(74) *Attorney, Agent, or Firm* — Lowenstein Sandler LLP

(57) ABSTRACT

A user device sends a search query for an item to a first data store associated with a first entity, wherein the item comprises at least one of an electronic version or a physical version, determines a format to be used by search queries to the second data store and generates a first modified search query for the second data store that is different than the search query and corresponds to the format. The user device sends the first modified search query to the second data store, receives item search results from the first data store and item search results from the second data store, the item search results indicating at least one of: the electronic version is available from an electronic location, the physical version is available at a physical location, or the physical location at which the physical version is available, and causes presentation of at least a portion of the item search results from the first data store together with at least a portion of the item search results from the second data store.

20 Claims, 10 Drawing Sheets

(56) References Cited

U.S. PATENT DOCUMENTS

| | | |
|---|---|---|
| 6,769,032 B1 * | 7/2004 | Katiyar ................ G06F 16/951 |
| | | 709/246 |
| 6,779,077 B1 | 8/2004 | Bakke et al. |
| 7,027,999 B2 * | 4/2006 | Smith .............. G06Q 10/06375 |
| | | 705/7.31 |
| 7,124,129 B2 | 10/2006 | Bowman et al. |
| 7,559,034 B1 | 7/2009 | Papemy et al. |
| 7,788,272 B2 | 8/2010 | Ray |
| 7,904,333 B1 * | 3/2011 | Perkowski ............ G06Q 30/02 |
| | | 705/14.4 |
| 8,849,670 B2 | 9/2014 | Di Cristo et al. |
| 2007/0106794 A1 | 5/2007 | Manber et al. |
| 2007/0185846 A1 | 8/2007 | Budzik et al. |
| 2007/0208751 A1 | 9/2007 | Cowan et al. |
| 2008/0114729 A1 * | 5/2008 | Raman ................ G06F 16/907 |
| 2009/0182566 A1 * | 7/2009 | Bhogal ................ G06Q 30/02 |
| | | 705/346 |
| 2009/0287683 A1 | 11/2009 | Bennett |
| 2012/0030022 A1 | 2/2012 | Ajima |
| 2012/0089601 A1 * | 4/2012 | Bailey .............. G06F 16/24578 |
| | | 707/723 |
| 2016/0335315 A1 | 11/2016 | Gelb et al. |

\* cited by examiner

UNIFIED PUBLICATION SEARCH AND CONSUMPTION INTERFACE

RELATED APPLICATIONS

This application is a continuation of U.S. patent application Ser. No. 12/790,672 filed May 28, 2010, the entire contents of which are hereby incorporated by reference herein.

BACKGROUND

A large and growing population of users enjoy entertainment through the consumption of digital publications (also referred to herein as media items), such as electronic books (also referred to herein as ebooks), electronic newspapers, electronic magazines, and other electronic reading material. Users employ various electronic devices to consume such publications. Among these electronic devices are electronic book readers, cellular telephones, personal digital assistants (PDAs), portable media players, tablet computers, electronic pads, netbooks, desktop computers, notebook computers, and the like.

Though users are rapidly adopting electronic book readers as a medium to enjoy reading material, many users still prefer to read physical versions of books (also known as hardcopy or print versions) on occasion, or prefer to borrow books from a library rather than purchasing those books. Additionally, many books are not available in an electronic version, or may be out of print and only available from a library. Presently, portable electronic devices such as electronic book readers do not provide a unified means for a user to search for physical versions of books at physical locations (e.g., brick and mortar stores and physical libraries) and electronic versions of books at electronic locations (e.g., online stores and electronic libraries), or to purchase and/or check out those books.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Methods and systems for enabling a user device and/or item providing system to perform publication searches and return results from multiple publication providers (e.g., libraries and book stores) for both electronic versions of publications and physical versions of publications in a unified manner are described. In one embodiment, an item providing system's catalog is searched for an electronic version of a publication and a third party's catalog is searched for a physical version of the publication. The item providing system may be associated with an online merchant, and the third party may be a physical library, a brick and mortar (B&M) retail store, an online classified advertisement service, an online auction service, or another entity. Publication search results may include physical locations (e.g., library locations or B&M retail store locations) at which the physical versions of the publications are available. In one embodiment, a location of the user device is determined, and distances to physical locations of the physical versions of the publication are included in the search results. A user of the user device may then purchase the electronic version of the publication and/or physical version of the publication, or may check out the physical version of the publication from a nearby library.

Figure 1:
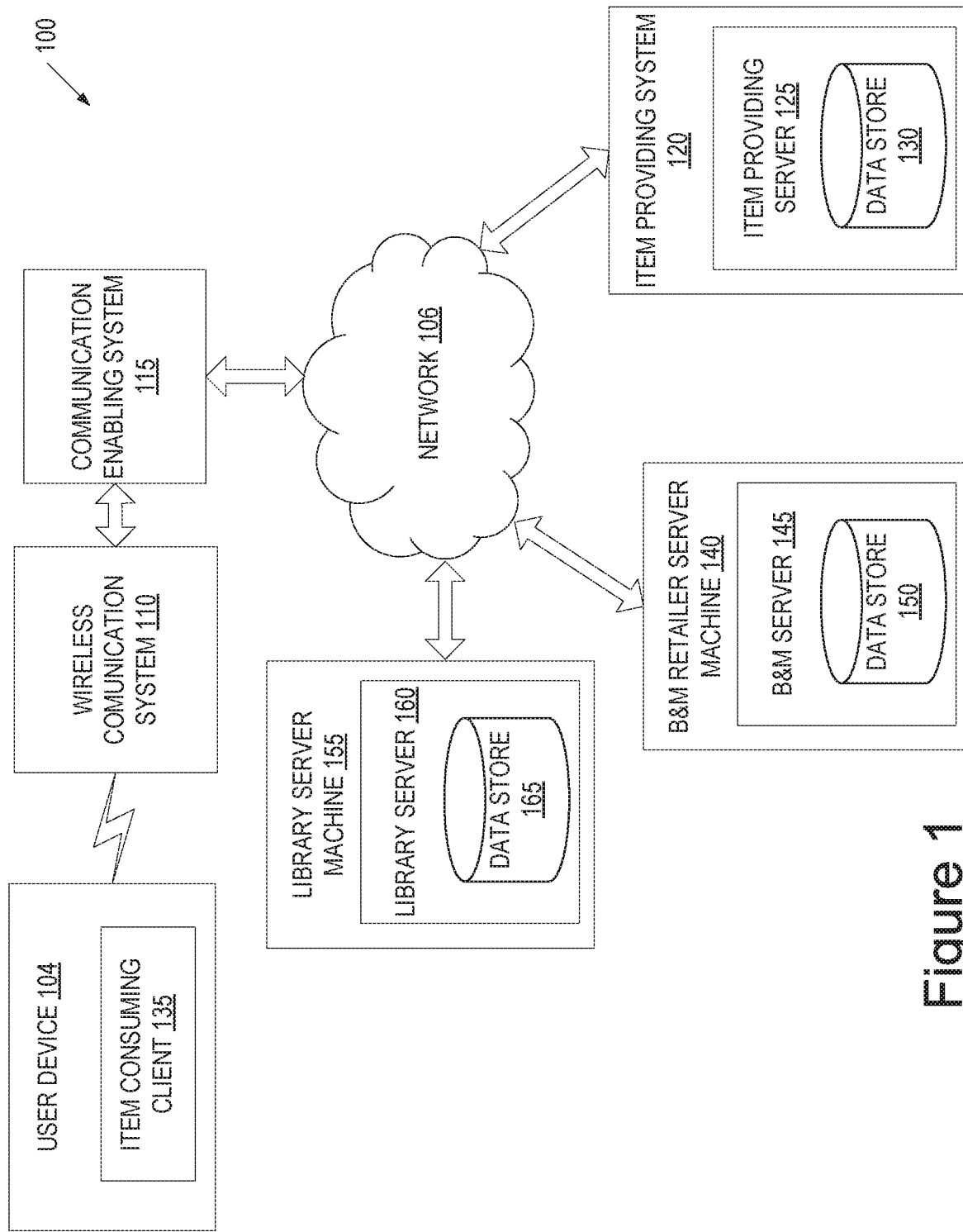
FIG. 1 is a block diagram of an exemplary network architecture.

FIG. 1 is a block diagram of an exemplary network architecture 100, in which embodiments described herein may operate. The network architecture 100 may include an item providing system 120, a library server machine 155, a brick and mortar (B&M) retailer server machine 140 and one or more user devices 104 capable of communicating with the item providing system 120, library server machine 155 and/or B&M retailer server machine 140 via a network 106 (e.g., public network such as the Internet or private network such as a local area network (LAN)). Note that the network architecture may also include other server machines (not shown), such as online auction server machines (e.g., for eBay® servers) and/or online classified advertisement server machines (e.g., for Craigslist® servers).

The user device 104 may be a portable computing device such as an electronic book reader or a tablet computer (e.g., that includes a book reader application). Other examples of portable computing devices include cellular telephones, personal digital assistants (PDAs), portable media players, netbooks, and the like. The user device 104 may also be an unportable computing device such as a desktop computer a set-top box associated with a television, a gaming console, and so on. The user devices 104 are variously configured with different functionality to enable consumption of one or more types of electronic books (ebooks) and/or other electronic publications (electronic versions of publications) such as electronic magazines, digital newspapers, digital audio books, electronic journals, real simple syndication (RSS) feeds, etc. The user devices 104 may also provide information about physical versions of publications, such as paperback books, hardcover books, physical newspapers, audio compact discs (CDs), physical versions of audio books (e.g., books on tape), etc.

The item-providing system 120 corresponds to any functionality or combination of functionality for providing publications to the user device 104. The item-providing system includes a network-accessible server-based functionality (item providing server 125), various data stores 130, and/or other data processing equipment. The item-providing system 120 may be implemented by a single machine or a cluster of machines. The item providing system 120 may include one or more machines (e.g., one or more server computer systems, routers, gateways, etc.) that have processing and storage capabilities to provide the server-based functionality.

In one case, the item providing server 125 corresponds to an entity which provides electronic publications to users upon the users' purchase of the items. In this role, the item providing server 125 may essentially act as a bookseller or the like. In one environment, the item providing server 125 may also offer services which allow users to purchase physical (hard-copy) versions of publications for physical delivery to the users. In this context, the item providing server 125 may allow users to download electronic items to respective user devices as part of its entire suite of services. In other cases, the item providing server 125 corresponds to an entity which provides publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The item providing server 125 delivers, and the user devices 104 receive, electronic publications, search results, upgrades, and/or other information via the network 106. For example, the user devices 104 may download or receive ebooks from the item providing server 125. The item providing server 125 also receives various requests (e.g., search queries), instructions and other data from the user devices 104 via the network 106.

Communication between the user device 104 and the item providing system 120, library server machine 155 or B&M retailer server machine 140 (or other server machines) may be enabled via any communication infrastructure. One example of such an infrastructure includes a combination of a wide area network (WAN) and wireless infrastructure, which allows a user to use the user device 104 to purchase items (e.g., electronic publications) and consume items without being tethered to the item providing system 120 or server machines 140, 155 via hardwired links. The wireless infrastructure may be provided by one or multiple wireless communications systems, such as wireless communications system 110. Wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user device 104.

The communication infrastructure may also include a communication-enabling system 115 that serves as an intermediary in passing information between the item providing system 120 (or library server machine 155 and/or B&M retailer server machine 140) and the wireless communication system 110. The communication-enabling system 115 may communicate with the wireless communication system 110 (e.g., a wireless carrier) via a dedicated channel, and may communicate with the item providing system 120 (or library server machine 155 and/or B&M retailer server machine 140) via a non-dedicated communication mechanism, e.g., a public Wide Area Network (WAN) such as the Internet.

As discussed above, the item providing system 120 includes item providing server 125. Similarly, B&M retailer server machine 140 includes B&M server 145 and library server machine 155 include library server 160. Each of the servers 125, 145, 160 may be web servers that respond to client search queries or other service requests (e.g., to purchase a publication, reserve a publication, check out a publication, etc.). These servers each include their own data store (or data stores) 130, 150, 165. The data stores may include catalogs of electronic versions of publications that can be obtained from the servers 125, 145, 160 (e.g., downloaded from the servers). The data stores may also include catalogs of physical versions of publications that can be obtained from physical locations identified by the data stores.

The user device 104 includes an item consuming client 135 for consumption of electronic versions of publications and/or physical versions of publications. The item consuming client 135 may generate search queries directed to a single server (e.g., item providing server 125) or to multiple servers. Each search query may be formatted in accordance with a format required by the server to which the query will be sent. For example, item providing server 125 may require search queries to have a different format than B &M server 145. Item consuming client 135 may receive publication search results from one or more of the servers, and display the search results on the user device 104 in a unified manner. Therefore, search results from the item providing server 125 may appear alongside search results from the library server 160. Item consuming client 135 may then generate purchase requests, reserve requests, check out requests, renewal requests, etc. for selected entries in the publication search results, and send those requests to an appropriate server.

Figure 2:
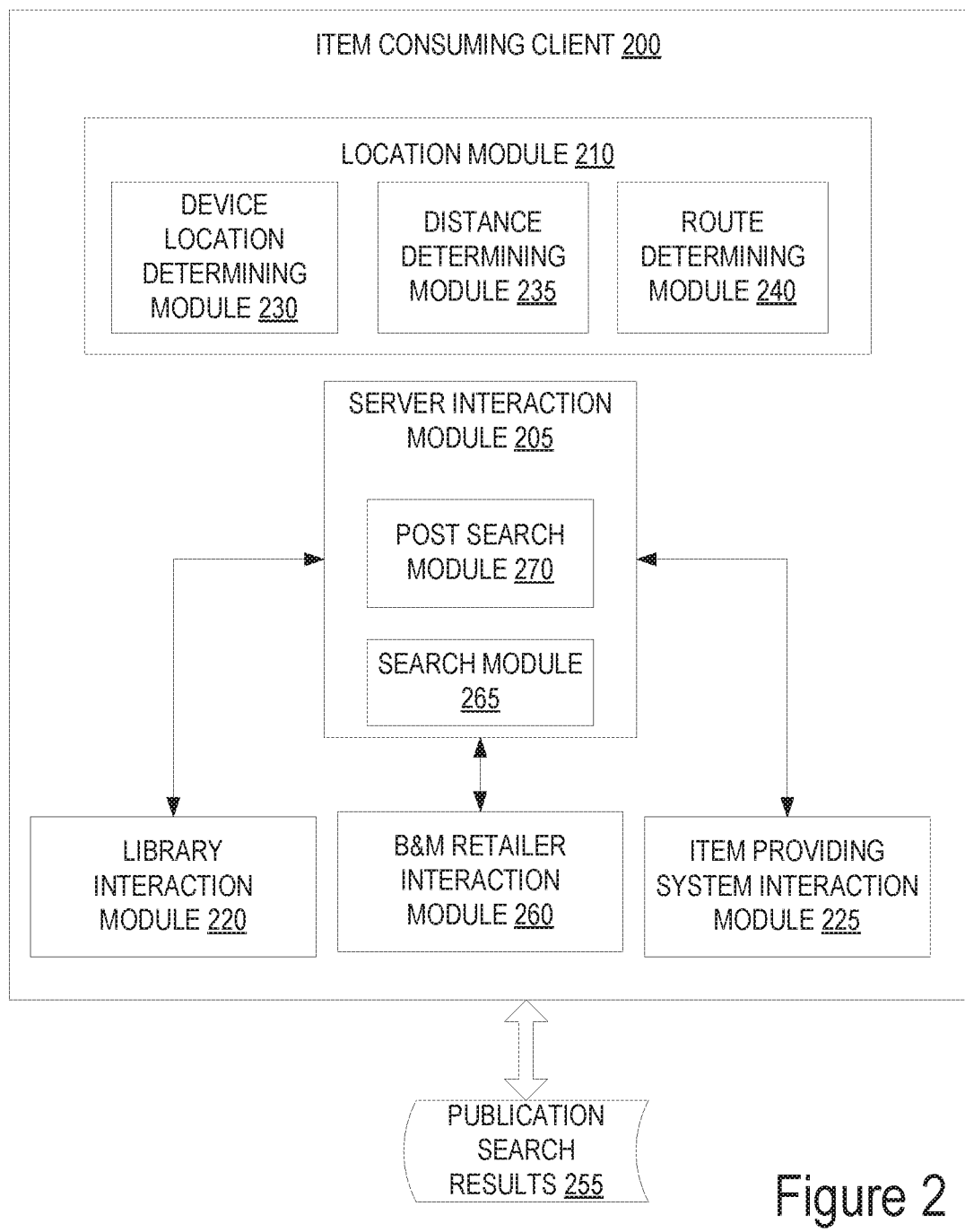
FIG. 2 is a block diagram of one embodiment of an item consuming client.

FIG. 2 is a block diagram of one embodiment of an item consuming client 200, which may correspond to the item consuming client 135 of FIG. 1. In one embodiment, the item consuming client 200 includes a location module 210 and a server interaction module 205.

Server interaction module 205 generates messages for data stores managed by servers, and receives responses from those data stores. Server interaction module 205 may also generate messages for servers that manage the data stores and receive responses from those servers. Each server and/or data store managed by that server may use a different communication protocol and/or require messages to be formatted in a different format. In one embodiment, to account for the many differences that may exist between data stores and/or servers, item consuming client 200 includes multiple interaction modules 220, 225, 260. Each of the interaction modules may be a plugin or extension to the server interaction module 205 that handles message formatting for a particular server and/or data store. For example, a library interaction module 220 may format search queries for a particular library server's data store, a B&M retailer interaction module 260 may format search queries for a particular B&M retailer server's data store, and the item providing system interaction module 225 may format search queries for an item providing system. Additionally, a classified advertiser interaction module (not shown) may format search queries for a particular online classified advertisement service's data store and/or an auction interaction module (not shown) may format search queries for a particular online auction server's data store.

In one embodiment, the server interaction module 205 includes a search module 265 and a post search module 270. The search module 265 receives user input, which is used to formulate a search query. For example, a user may request a search for a particular book title, author, publication date, publisher, genre, etc. In one embodiment, search module 265 generates a generic search query based on the user input, and provides the generic search query to each of the interaction modules 220, 225, 260. Alternatively, the user may specify which servers/data stores the user would like to search, in which case the search query is only sent to the interaction modules associated with those servers. The search module 265 may also determine which servers/data stores to search based on predefined criteria. Such criteria may include data stores that reflect catalogs of physical locations within a threshold distance from the user device, servers for which the user device has subscription information (e.g., servers of public libraries for which the user of the user device has an account), data stores for favorite retailers of the user, etc.

Each interaction module that receives the generic search query may generate a specific search query based on the information in the generic search query. The specific search query is formatted in a format required by the server/data store to which the search query will be sent. Server interaction module 205 sends the search queries to their intended servers/data stores. Server interaction module 205 then receives search results 255 from the servers/data stores.

A user may navigate through returned search results 255, and select a publication search result with which to perform an additional action. This additional action may be to request additional information about the publication search result (e.g., a synopsis of the identified publication, a sample of the publication, etc.), to purchase the identified publication, to check out the identified publication, to reserve the identified publication, to place a hold on the identified publication (e.g., so that a user can pick up the publication from a B&M retail location), etc. What options are available for additional actions may depend on which server/data store the search result originated from (e.g., whether the identified publication is a physical publication or an electronic publication, whether the publication is in stock, etc.).

Post search module 270 generates messages for the appropriate data store/server (or data stores/servers) associated with a selected publication search result (or results). Post search module 270 may determine what post search actions are available with the data store/server from the interaction module for that data store. For example, if a selected publication search result was a physical publication search result from a library server associated with library interaction module 220, a user may have the option to check out the publication or reserve the publication if it is already checked out. If, on the other hand, the selected publication search result was an electronic publication or physical publication search result from the item providing server, the user may have the option to request reviews of the publication, request a sample of the publication, purchase the publication, place a hold on the publication, etc. The user may also have additional options for actions that are associated with a particular server, but not necessarily with a performed search. For example, the post search module 270 may provide a user with an option to pay library fines to a particular library or libraries. Once a user selects an action, post search module 270 may rely on the appropriate interaction module to generate a message for requesting a server or data store to perform that action.

Location module 210 provides location information for returned publication search results 255. In one embodiment, location module 210 includes a device location determining module 230 that determines a location of the user device on which item consuming client 200 runs. In one embodiment, the device location determining module 230 includes a global positioning system (GPS) receiver for determining a location of the user device. Alternatively, the device location determining module 230 may use WiFi hotspot triangulation or cell tower triangulation to determine a location of the user device.

The search results 255 may include physical locations at which physical versions of publications are located. Alternatively, location module 210 may access a database provided by the item providing server that identifies physical locations associated with particular data stores/servers. In one embodiment, location module 210 includes a distance determining module 235 that determines a distance between the user device and physical locations at which physical versions of publications in search results 255 are located. The distances may be determined based on the determined location of the user device and the identified or determined locations of physical versions of publications (e.g., included in the publication search results 255).

In one embodiment, location module 210 includes a route determining module 240 that computes a route between the user device and a physical location of a physical version of a publication. For example, a user may select a physical version of a publication from the search results 255, and may request directions to the physical location associated with the selected physical version of the publication. The route determining module 240 may then compute an optimal route between the user device and the physical location (e.g., using existing routing techniques such as those included in GPS software and GPS devices).

Figure 3:
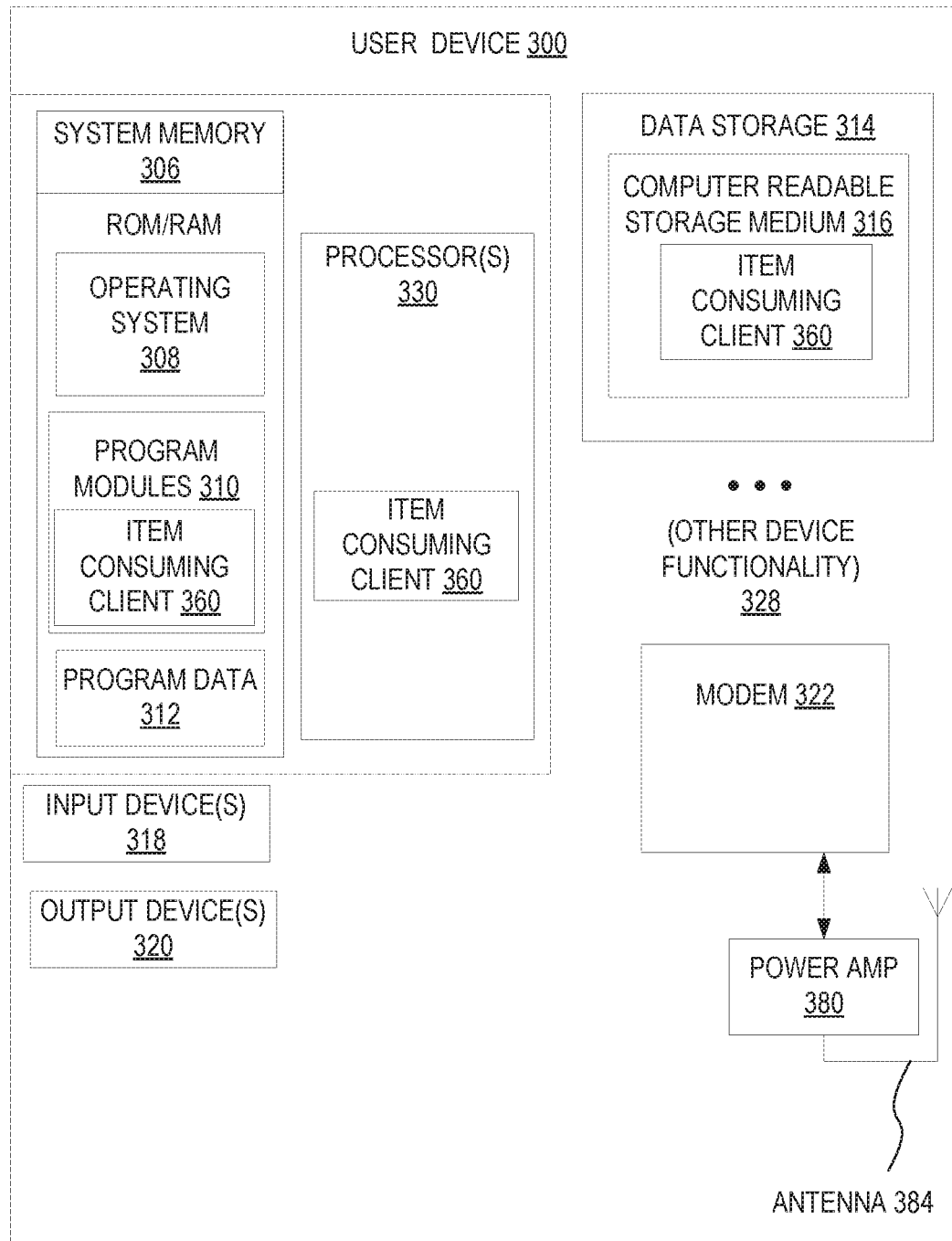
FIG. 3 is a block diagram illustrating an exemplary user device.

FIG. 3 is a block diagram illustrating an exemplary user device 300. The user device 300 may correspond to the user device 104 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 300 includes one or more processors 330, such as one or more CPUs, microcontrollers, field programmable gate arrays, or other types of processors. The user device 300 also includes system memory 306, which may correspond to any combination of volatile and/or non-volatile storage mechanisms. The system memory 306 stores information which provides an operating system component 308, various program modules 310 such as book consumption client 360, program data 312, and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the item consuming client 360 may reside, completely or at least partially, within the computer readable storage medium 316, system memory 306 and/or within the processor(s) 330 during execution thereof by the user device 300, the system memory 306 and the processor(s) 330 also constituting computer-readable media. The user device 300 may also include one or more input devices 318 (keyboard, mouse device, specialized selection keys, etc.) and one or more output devices 320 (displays, printers, audio output mechanisms, etc.).

The user device 300 further includes a wireless modem 322 to allow the user device 300 to communicate via a wireless network (e.g., such as provided by the wireless communication system) with other computing devices, such as remote computers, the item providing system, online book stores, electronic catalogs for libraries, and so forth. The wireless modem 322 may allow the user device 300 to handle both voice and non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. The wireless modem 322 may generate signals and send these signals to power amplifier (amp) 380 for amplification, after which they are wirelessly transmitted via antenna 384. In addition to sending data, antenna 384 also receives data, which is sent to wireless modem 322 and transferred to processor(s) 330.

Figure 4:
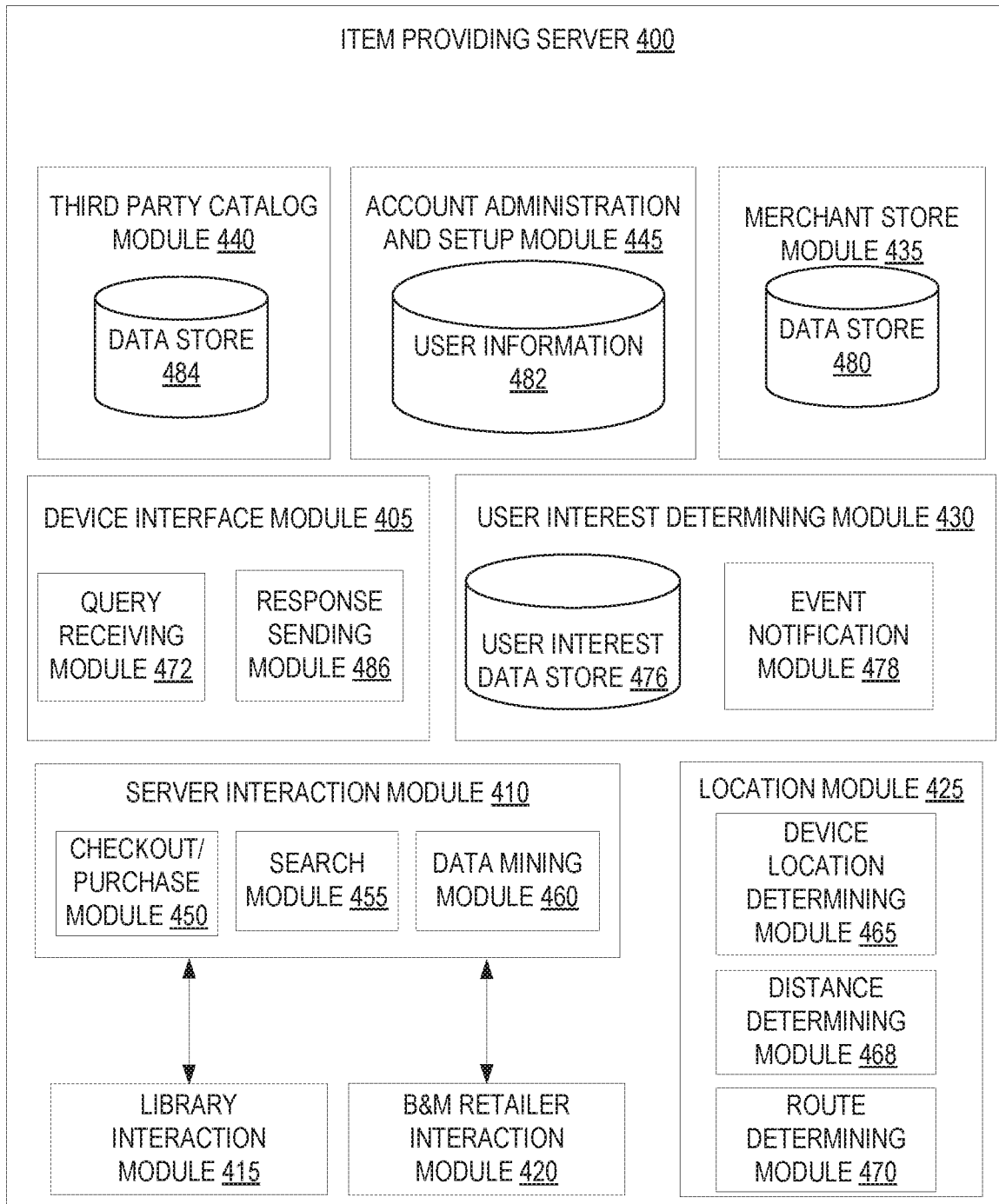
FIG. 4 is a block diagram of one embodiment of an item providing server.

FIG. 4 is a block diagram of one embodiment of an item providing server 400, which may correspond to the item providing server 125 of FIG. 1. In one embodiment, the item providing server 400 includes a location module 425, a server interaction module 410, a device interface module 405, a user interest determining module 430, a third party catalog module 440, a merchant store module 435 and an account administration and setup module 445.

Device interface module 405 interfaces with user devices. The device interface module 405 includes functionality which allows the item providing server 400 to interact with the item consuming clients running on user devices. In one embodiment, the device interface module 405 includes a query receiving module 472 and a response sending module 486. The query receiving module 472 may receive requests from user devices to browse contents of a merchant store module's data store 480 and/or to browse a third party catalog module's data store 484. The query receiving module 405 may also receive search queries from user devices. Additionally, query receiving module 472 may receive requests to perform actions from the user devices, such as requests to purchase publications, requests to check out publications (e.g., from a library), requests to reserve publications, requests to place publications in a wish list, and so on. After query receiving module 472 receives a request from a user device (e.g., a browse request, search query, purchase request, etc.), device interface module 405 forwards the request to an appropriate module (e.g., to third party catalog module 440, to merchant store module 435 and/or to server interaction module 410).

Response sending module 486 provides search results and other information to user devices. Response sending module 486 receives responses (or other information) from one or more of the third party catalog module 440, merchant store module 435 and server interaction module 410, and sends these responses/information to the user device. Response sending module 486 may format responses and information into a series of pages using a markup language or any other format. These pages may include search results and/or information on some subset of items available in data stores 480 and/or 484. The pages may then be provided to the user device.

The query receiving module 472 may receive additional input from a user who interacts with the pages that were provided to the user device. For example, the user may select links in the pages. The user's selections may be conveyed back to query receiving module 472 using the HTTP protocol or some other protocol or combination of protocols. Based on the user's selections, additional pages having additional responses/information may be generated and sent to the user device. The additional input may also include input to purchase, check out, reserve, renew, etc. digital or electronic versions of publications. Such activities are explained in greater detail below.

Response sending module 486 may also perform the transfer of content such as electronic publications, software updates, etc. to the user device 104. For example, after a user has searched for a publication, received search results including an electronic version of that publication that is available in data store 480, and purchased the electronic version of the publication from merchant store module 435, response sending module 486 may download the electronic version of the publication to the user device.

The merchant store module 435 enables a user to purchase electronic and physical versions of publications from the item providing server 400. The merchant store module 435 includes a data store 480, which has a catalog of publications. The publications in the catalog may be electronic versions of publications and/or physical versions of publications, which may be available for purchase from the merchant store module 435. Some publications in data store 480 may be publications sold by third parties that contract with an operator of item providing server 400. Merchant store module 435 may provide the same functionality for such publications that are sold by the contracting third parties as for the publications sold by the item providing server 400. The data store 480 may include descriptions of various items that may be selected using the merchant store module 435. A description of an item in the data store 480 may take the form of an item detail page.

The merchant store module 435 includes functionality allowing a user to search and browse though the publication catalog in the data store 480. The merchant store module 435 may also include functionality allowing a user to purchase publications (or, more generally, acquire publications based on any terms). In one case, a user may interact with the merchant store module 435 via the device interface module 405. When the user purchases or otherwise acquires a publication via the merchant store module 435, the item providing server 400 may invoke the response sending module 486 to deliver the publication to the user.

The merchant store module 435 may include Item Review and Acquisition (IRA) functionality. The IRA functionality allows the user to review items in the data store 480 by entering search terms, viewing browse categories, and so on. The IRA functionality may also present one or more recommended items to the user, e.g., based on the user's prior interests (e.g., as reflected in the user interest data store 476), or based on generally popular items, and so on. The IRA functionality also allows the user to place items in a shopping cart and purchase (or otherwise acquire) the items.

On occasion a user may search for a publication that is not available in the merchant store module's data store 480. Additionally, a publication may be available in the data store 480, but a user may wish simply to borrow the publication from a library, or may wish to purchase the physical version of the publication from a physical (brick and mortar) retailer that is close to the user. To address these circumstances, item providing server 400 includes a third party catalog module 440. The third party catalog module 440 includes one or more data stores 484, which have catalogs of one or more third party libraries and/or retailers. The third party catalog module 440 may include a separate data store 484 for each third party, or may include one or more data stores 484 that include catalogs of multiple third parties. In one embodiment, third party catalog module 440 includes a library data store that includes catalogs of libraries and a retailer data store that includes catalogs of retailers.

Third party catalog module 440 may provide search results to response sending module 486 in response to receiving a search query. Third party catalog module 440 may identify what third party each of the entries in included search results are from, as well as physical locations of those third parties (e.g., an address of a physical library where a search result can be found).

Server interaction module 410 interacts with third party servers to obtain catalog information for populating data store 484, for searching third party data stores for information, for purchasing publications from the third party servers, and so on. In one embodiment, server interaction module 410 includes a search module 455, a data mining module 460 and a checkout/purchase module 450.

Data mining module 460 periodically contacts third party servers to obtain updated contents of those third party server's publication catalogs. Received catalog information may include publications sold by a third party retailer, on hand stock at each physical location of the third party retailer, publications that are included in a library's catalog, available/checked out statuses of the publications from the library, and so on. Data mining module 460 may contact third party servers to obtain updated catalog information once a day, once an hour, or at some other interval.

In addition to searching data store 480 and data store 484 for publications, item providing system 400 may also send additional search queries out to third party servers when query receiving module 472 receives a search query. Such searches are performed by search module 455. Search module 455 may generate search queries, for example, when a received search query indicates that specific third party catalogs should be searched for contents, and when data store 484 does not include the contents of those specific third party catalogs. Additionally, if data store 484 does include contents of the specified third party catalogs, but those contents have expired (e.g., are more than a week old), search module 455 may generate the search.

Search module 455 receives search results from the third party servers, and reports the search results to response sending module 486 and/or to third party catalog module 440. Response sending module 486 may include the results along with other search results (e.g., from data store 480) in a unified search results page (or pages). Third party catalog module 440 may also add the search results to data store 484. Therefore, if another user requests the same search of the same third party's publication catalog, the search results may be obtained from data store 484, and search module 455 does not need to query any third party servers.

Checkout/purchase module 450 manages user commands for checking out, purchasing, reserving, placing a hold on, or performing other actions associated with publications provided by third parties. When query receiving module 472 receives a command to purchase, reserve, check out, etc. a publication from a third party, that command is forwarded to checkout/purchase module 450. Checkout/purchase module 450 determines an appropriate server for satisfying received commands. For commands directed to third party servers, checkout/purchase module 450 either forwards the command on to the appropriate third party server, or generates a new command and sends the new command to the third party server. Note that in addition to standard purchase and checkout functionality, checkout/purchase module 450 can also perform advanced purchase functions, such as initiating the purchase of a physical version of a publication from a B&M retailer, and causing the publication to be placed on hold at a closest physical location of the B&M retailer to the user device.

Each third party server and/or data store managed by that server may use a different communication protocol and/or require messages to be formatted in a different format. In one embodiment, to account for the many differences that may exist between data stores and/or servers, item providing server 400 includes multiple interaction modules 415, 420. Each of the interaction modules may be a plugin or extension to the server interaction module 410 that handles message formatting for a particular server and/or data store.

Account administration and setup module 445 allows users to set up a user account and perform other administrative functions. The account administration and setup module 445 includes or has access to user information 482. User information 482 may include user login and password information. In one embodiment, the user information 482 includes login and password information for the user to one or more third party servers. For example, user information 482 may include a user's login and password to a physical library's server, to an online retailer's server, etc. This enables server interaction module 410 to use the user information 482 to login to third party servers on the user's behalf and perform actions such as reserving physical versions of publications, checking out physical versions of publications, or purchasing physical and/or electronic versions of publications. This also enables server interaction module 410 to use the user information 482 to log in to third party servers of retailers to purchase electronic and/or physical versions of publications.

User interest determining module 430 stores information regarding the interests of each user. In one embodiment, user interest determining module 430 includes a user interest data store 476 and an event notification module 478. The user interest data store 476 may include demographic information regarding users and information regarding the prior purchases made by the users. Additionally, user interest data store 476 may include prior searches made by users, publications checked out or reserved from third party libraries by the users, and other types of selections.

When a search query is received by query receiving module 472, query receiving module 472 may forward the search query to user interest determining module 430. User interest determining module 430 may store the search query in user interest data store 476. Additionally, or instead, event notification module 478 may search for publication events that may be of interest to the user based on the search query. Event notification module 478 may then generate a report of publication events that may be of interest to the user, and send those to response sending module 486, which may include the publication events in the search results. Event notification module 478 may also periodically search for publication events that may be of interest to a user based on contents of the user interest data store 476. Event notification module 478 may send notices on publication events that might be of interest to the user to response sending module 486, which may notify the user of the events.

Location module 425 inserts location information into search results. In one embodiment, location module 425 includes a device location determining module 465, a distance determining module 468 and a route determining module 470. Device location determining module 465 determines a location of a user device. The location of the user device may be determined by querying the user device for its location (e.g., if the user device includes a GPS receiver or a mobile phone antenna for cell tower triangulation). The location of the user device may also be determined based on the user device's internet protocol (IP) address.

Some third party retailers and third party libraries include physical locations. The catalog entries may identify which physical locations particular publications are available at. Distance determining module 468 receives search results (e.g., for third party retailers and/or libraries), and for each physical version of a publication available at a physical location included in the search results, computes a distance between the location of the user device and the physical location. This distance information may be reported to response sending module 486, and inserted into the search results.

In one embodiment, search results are filtered based on distance from the user device. For example, location module 425 may include a distance threshold, and all search results having a distance that is greater than the distance threshold may be filtered out of the search results. Such filtering may be performed, for example, by the location module 425 or by the device interface module 405. In another embodiment, such queries are filtered so that only publication catalogs of third parties that have a physical location within a threshold distance from the user device are searched.

Search results may also be filtered based on criteria other than distance from the user device. For example, search results may be filtered so that only search results from retailers and/or libraries with which the user has an account are provided to the user. Search results may also be filtered to present to the user only or primarily search results from retailers and/or libraries from which the user often makes purchases or checks out publications. Search results may also be ordered so that search results associated with retailers/libraries that the user often interacts with are presented first. Search results may also be ordered based on distance to the user device. In one embodiment, filter criteria and/or ordering criteria can be user specified.

Query receiving module 472 may receive a request for directions to a physical location of a physical version of the searched publication. For example, a user may select an entry from the reported search results, and may request route information for that entry. Query receiving module 472 provides the route request to route determining module 470, which computes the route between the user device and the physical location. In one embodiment, route determining module 470 queries a third party mapping service such as Google® Maps for performing the routing. Route determining module 470 then sends the route information to response generator 486, which provides it to the user device.

Figure 5:
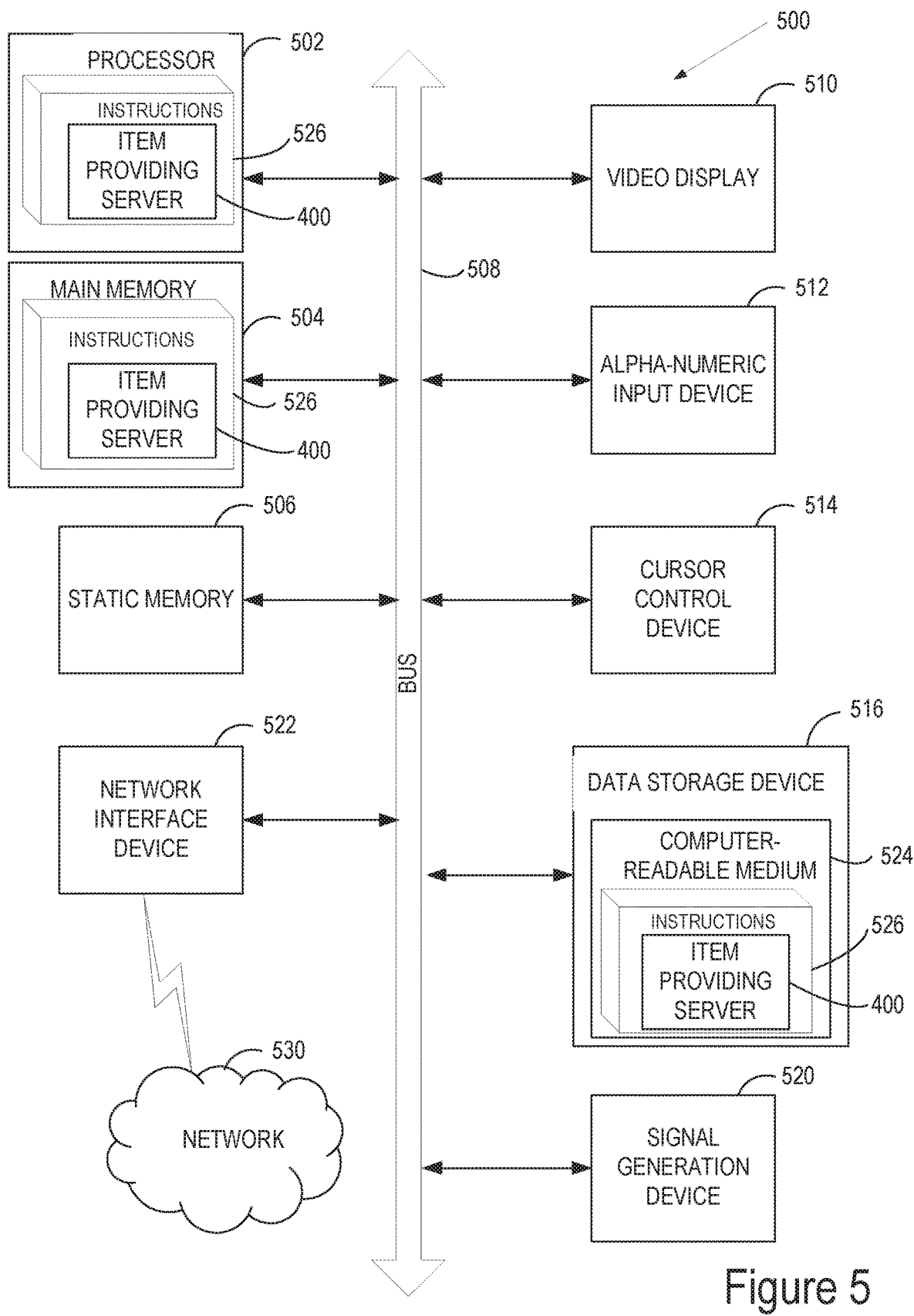
FIG. 5 is a block diagram illustrating an exemplary computing device.

FIG. 5 is a block diagram illustrating an exemplary server computing device 500. In one embodiment, the server computing device corresponds to item providing system 120 of FIG. 1. The server computing device 500 includes a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the item providing server 400 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions (instructions of item providing sever 400) embodying any one or more of the methodologies or functions described herein. The item providing server 400 may also reside, completely or at least partially, within the main memory 504 and/or within the processor 502 during execution thereof by the computer system 500, the main memory 504 and the processor 502 also constituting computer-readable media. The device profile module 110 may further be transmitted or received over a network 530 via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 6:
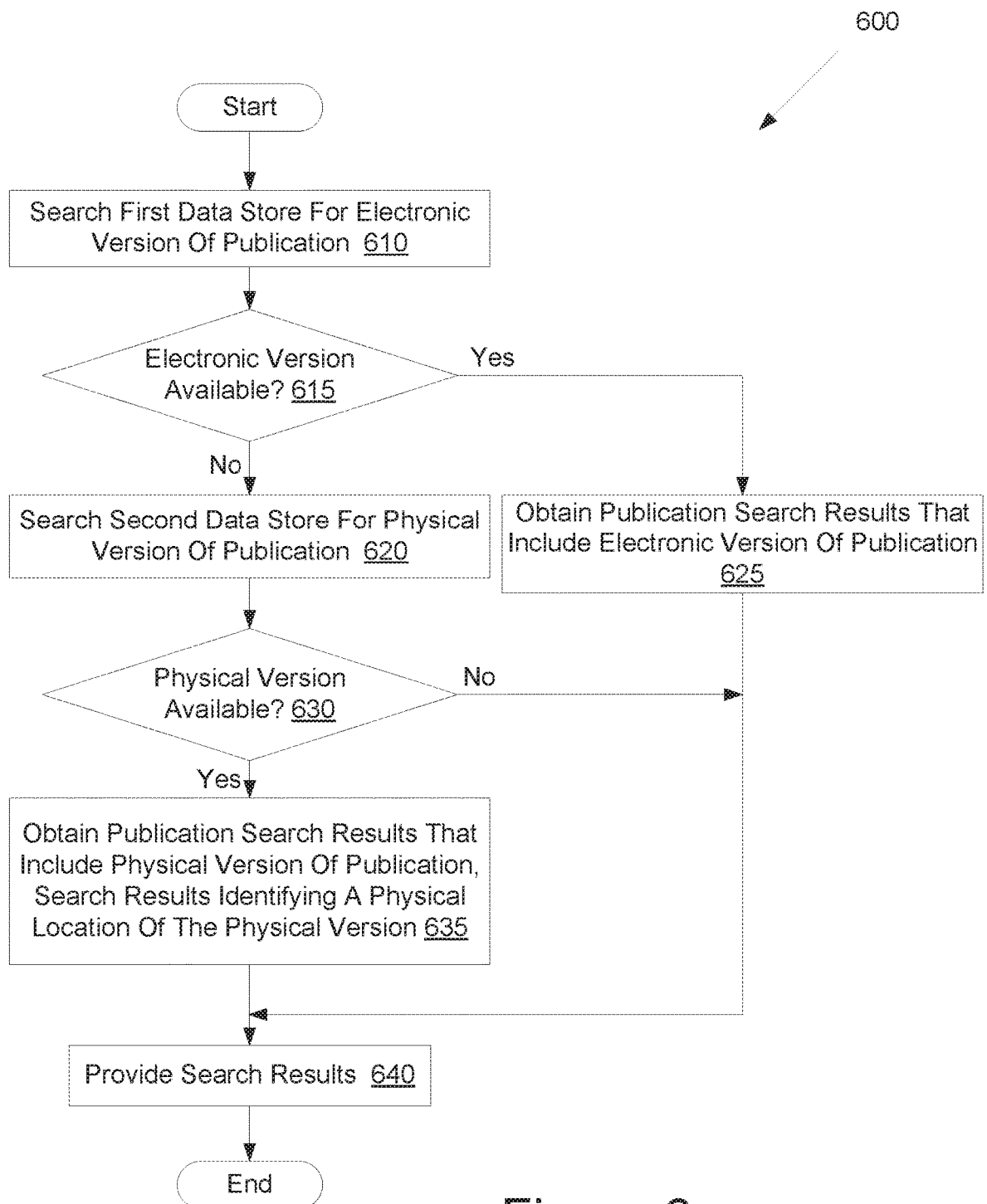
FIG. 6 is a flow diagram of one embodiment of a method for searching data stores for physical and electronic versions of publications.

FIG. 6 is a flow diagram of one embodiment for a method 600 of searching data stores for physical and electronic versions of publications. The method is performed by processing logic that may comprise hardware (circuitry, dedicated logic, etc.), software (such as is run on a general purpose computer system or a dedicated machine), or a combination of both. In one embodiment, method 600 is performed by a user device (e.g., an item consuming client 135 of user device 104 of FIG. 1). In another embodiment, method 600 is performed by an item providing system (e.g., by item providing server 125 of item providing system 120 of FIG. 1). Alternatively, some operations of method 600 are performed by a user device, while other operations of method 600 are performed by an item providing system.

Referring to FIG. 6, at block 610 of method 600 processing logic searches a first data store for an electronic version of a publication. This may include generating a single search query and sending the search query to a single server, generating multiple search queries and sending each search query to a different server, or generating a single search query and sending copies of that single search query to different servers. For example, if method 600 is performed by a user device, the user device may generate a single search query and send that search query to an item providing system. The item providing system may then handle querying other data stores and/or servers. Alternatively, the user device may generate multiple search queries, and send one of the search queries to the item providing server and other search queries to other servers.

At block 615, processing logic determines whether an electronic version of the publication is available. If an electronic version of the publication is available, the method continues to block 625. If no electronic version of the publication is available, the method continues to block 620.

At block 625, processing logic obtains publication search results that include the electronic version of the publication. In one embodiment (as illustrated), the method continues to block 640 (i.e., physical versions of publications are not searched if electronic versions are found). Alternatively, the method may continue to block 620 from block 625. In such an embodiment, physical versions of the publication are searched regardless of whether or not electronic versions of the publication are found.

At block 620, processing logic searches a second data store for a physical version of the publication. At block 630, processing logic determines whether there are any physical versions of the publication available. If there are no physical versions available, the method continues to block 640. If physical versions are available, the method continues to block 635.

At block 635, publication search results that include a physical version of the publication are obtained. The obtained search results may identify a physical location of the physical version of the publication.

At block 640, the search results are provided to a user. If method 600 is performed by a user device, providing the search results to the user includes displaying the search results to the user. Physical versions and electronic versions of the publication may be displayed together in a unified search results view. If method 600 is performed by an item providing system, providing the search results may include transmitting the search results to a user device.

Figure 7:
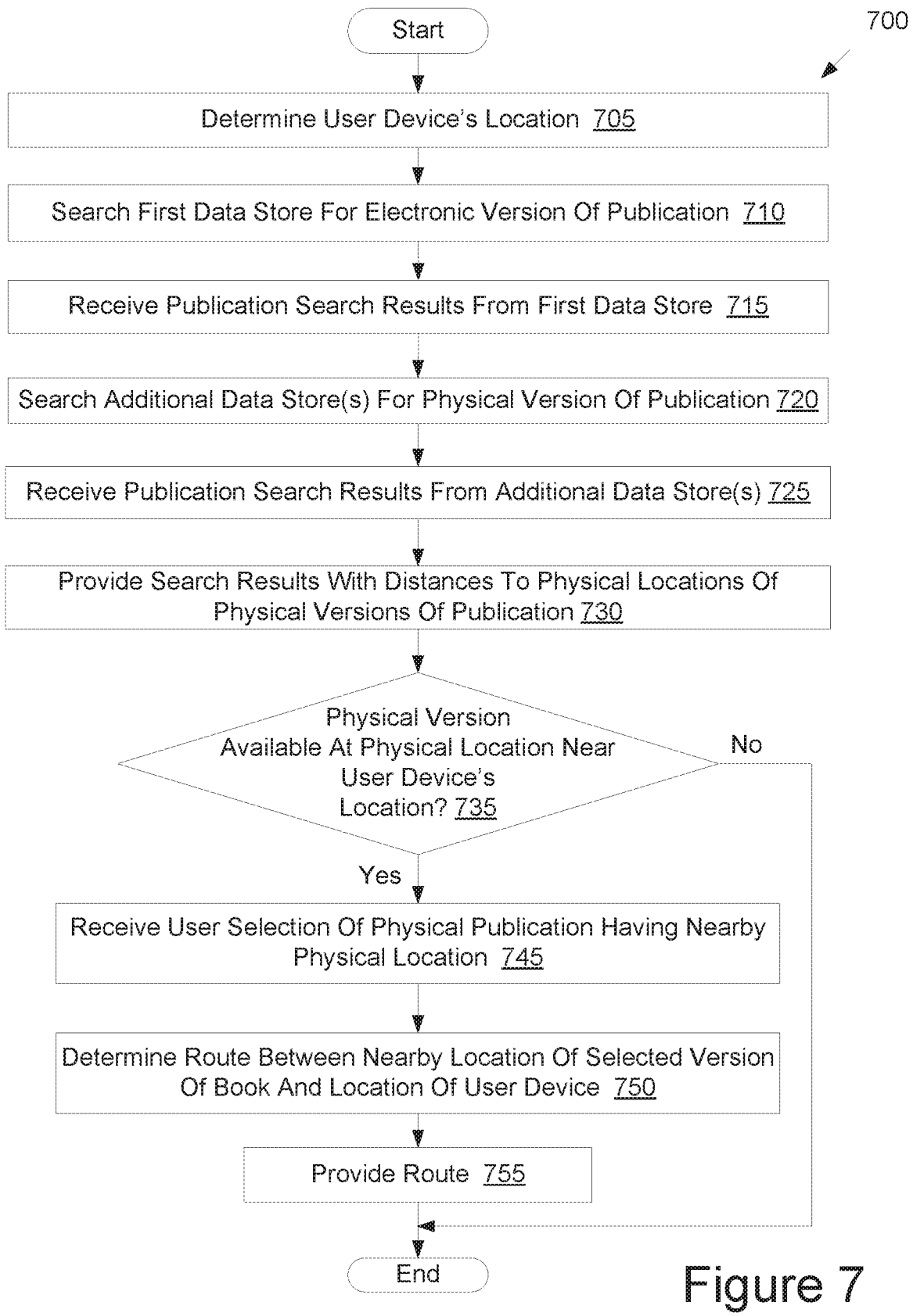
FIG. 7 is a flow diagram of another embodiment of a method for searching data stores for physical and electronic versions of publications.

FIG. 7 is a flow diagram of another embodiment of a method 700 for searching data stores for physical and electronic versions of publications. The method is performed by processing logic that may comprise hardware (circuitry, dedicated logic, etc.), software (such as is run on a general purpose computer system or a dedicated machine), or a combination of both. In one embodiment, method 700 is performed by a user device (e.g., an item consuming client 135 of user device 104 of FIG. 1). In another embodiment, method 700 is performed by an item providing system (e.g., by item providing server 125 of item providing system 120 of FIG. 1). Alternatively, some operations of method 700 are performed by a user device, while other operations of method 700 are performed by an item providing system.

Referring to FIG. 7, at block 705 of method 700 processing logic determines a user device's location. The user device's location may be determined using a GPS receiver included in the user device, by triangulating the location of the user device using cell tower triangulation, or based on an IP address of the user device.

At block 710, processing logic searches a first data store for an electronic version of the publication. Searching the first data store may include generating a search query, formatting the search query for the particular data store, and sending the search query to that particular data store. At block 715, processing logic receives publication search results from the first data store.

At block 720, processing logic searches one or more additional data stores for a physical version of the publication. Searching the additional data stores may include generating one or more search queries, formatting the search queries for the additional data stores, and sending the search queries to the additional data stores. At block 725, processing logic receives publication search results from the additional data stores.

At block 730, processing logic provides the search results to a user along with distances to physical locations of physical versions of the publication. At block 735, processing logic determines whether there is a physical version of the publication that is available at a physical location that is near the user device's location. A physical location that is near the user device's location is a physical location that is within a threshold distance from the user device. The threshold distance may be 1 mile, 3 miles, 5 miles, 20 miles, etc. The threshold distance may be variable, and may be user configurable. If there is a physical version located near (within a threshold distance from) the user device, the method continues to block 745. Otherwise, the method ends.

At block 745, processing logic receives a user selection of a physical publication having a nearby physical location (physical location that is within the threshold distance). At block 750, processing logic determines a route between the nearby location of the selected version of the publication and the location of the user device. At block 755, the route is provided to a user of the user device. The use may then use the route to navigate to the physical version of the publication. In one embodiment, the route updates as the user navigates towards the physical version of the user device (e.g., similar to the manner in which GPS devices update route information to a destination as a user travels).

Figure 8:
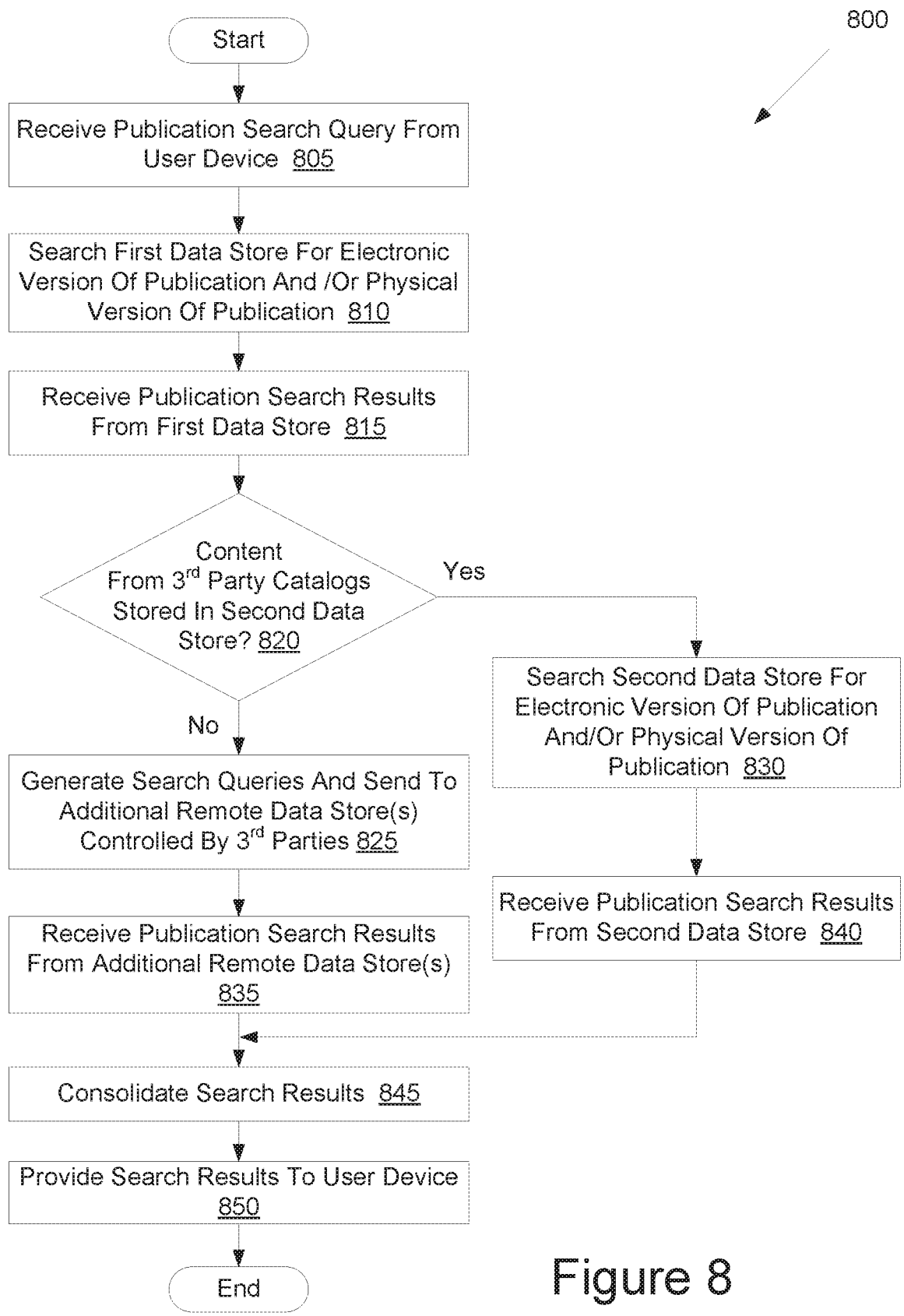
FIG. 8 is a flow diagram of yet another embodiment of a method for searching data stores for physical and electronic versions of publications.

FIG. 8 is a flow diagram of yet another embodiment of a method for searching data stores for physical and electronic versions of publications. The method is performed by processing logic that may comprise hardware (circuitry, dedicated logic, etc.), software (such as is run on a general purpose computer system or a dedicated machine), or a combination of both. In one embodiment, method 700 is performed by an item providing system (e.g., by item providing server 125 of item providing system 120 of FIG. 1).

Referring to FIG. 8, at block 805 of method 800 processing logic receives a publication search query from a user device. The publication search query includes search terms for an author, title, publisher, etc. At block 810, processing logic searches a first data store for an electronic version and/or a physical version of the publication. At block 815, processing logic receives publication search results from the first data store.

At block 820, processing logic determines whether content from third-party catalogs is stored in a second data store. If content from third-party catalogs is stored in a second data store, the method continues to block 830. Otherwise, the method continues to block 825.

At block 830, processing logic searches the second data store for an electronic version and/or a physical version of the publication. At block 840, processing logic receives publication search results from the second data store.

At block 825, processing logic generates one or more search queries, and sends the additional search queries to one or more additional remote data stores that are controlled by third parties. For example, processing logic may send a first search query to a public library server and a second search query to a third-party retailer server. At block 835, processing logic receives publication search results from the additional remote data stores.

At block 845, processing logic consolidates the search results from the first data store, the second data store and or the additional data stores. At block 850, processing logic provides the search results to a user device. In addition to the search results, processing logic may also provide additional information such as publication events that might be of interest to the user, distances to physical versions of publications, reviews of publications, samples of publications, author biographies, and more additional information.

Figure 9:
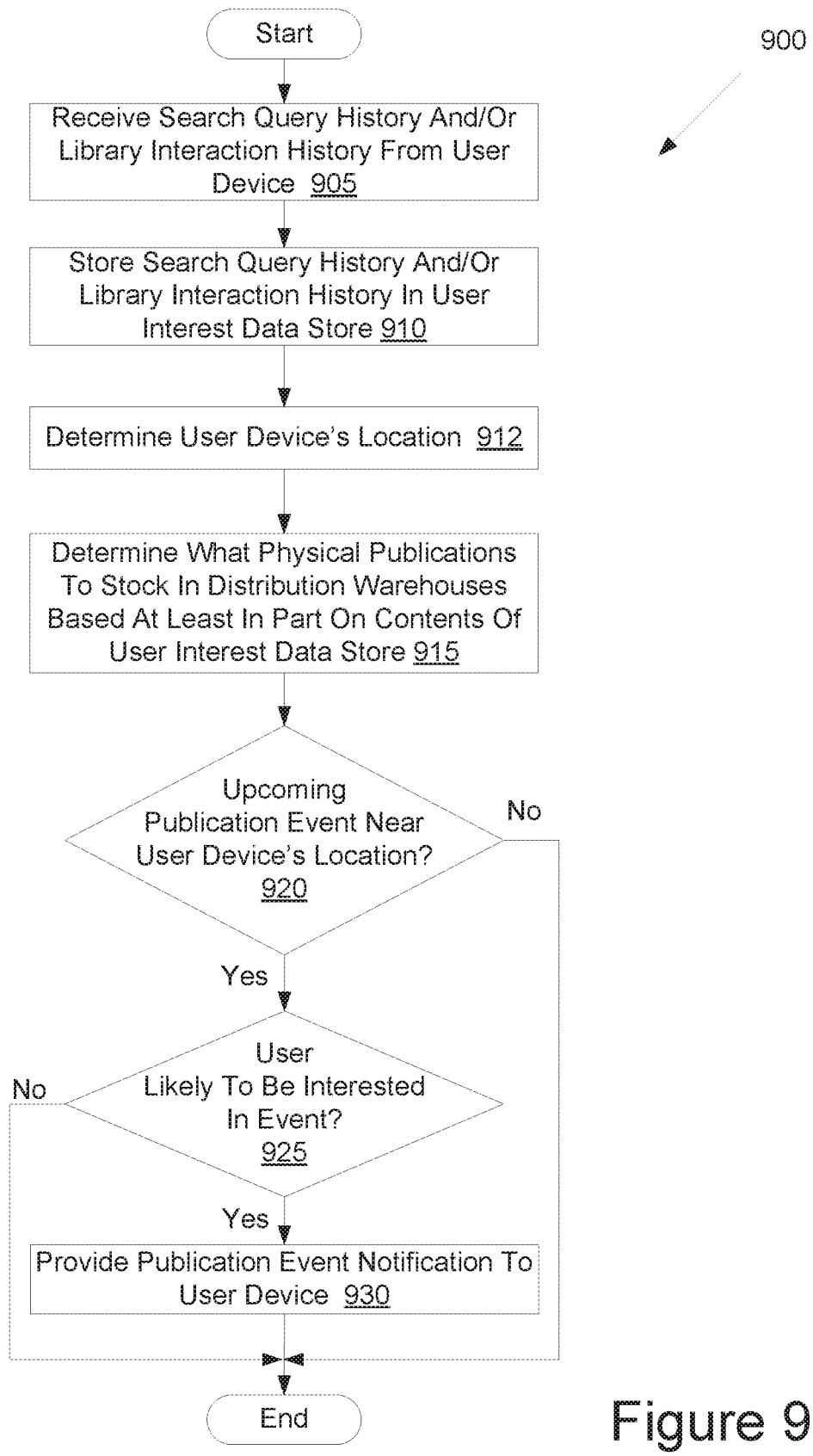
FIG. 9 is a flow diagram of still one embodiment for a method of using a user interest data store to provide information to a user and/or to stock publications.

FIG. 9 is a flow diagram of one embodiment for a method 900 of using a user interest data store to provide information to a user and/or to stock publications. The method is performed by processing logic that may comprise hardware (circuitry, dedicated logic, etc.), software (such as is run on a general purpose computer system or a dedicated machine), or a combination of both. In one embodiment, method 900 is performed by an item providing system (e.g., by item providing server 125 of item providing system 120 of FIG. 1).

Referring to FIG. 9, at block 905 of method 900 processing logic receives a search query history and or a library interaction history from a user device. Alternatively, processing logic may receive a search query from the user device.

At block 910, processing logic stores the search query history and or the library interaction history in a user interest data store. If a current search query was received from the user device, the current search query may be stored in the user interest data store.

At block 912, processing logic determines locations of a user device. Processing logic may further determine the locations of other user devices.

A block 915, processing logic determines what physical publications to stock in distribution warehouse is based at least in part on contents of the user interest data store. For example, the user interest data store may indicate that a large number of users in a particular region may have an interest in a particular publication or publications. Accordingly, a distribution warehouse that serves that region may be stocked with the publications.

At block 920, processing logic determines whether there are any upcoming publication events near a user device's location. Examples of publication events include book readings, book signing events, author interviews, etc. A publication event that is near the user device's location may be a publication event this within a threshold distance from a current location of the user device. In one embodiment, publication events that will occur within a particular time period are included in the determination. For example, publication events within a 5 mile radius of the user device location that will occur within the next two months may be determined. If there is at least one upcoming publication event near the user device's location, the method proceeds to block 925. Otherwise, the method ends.

At block 925, processing logic determines whether the user is likely to be interested in any of the determined events. This may be determined based on one or more entries in the user interest data store for that user, based on a current search query, or based on other information. If there are publication events that the user is likely to be interested in, the method proceeds to block 930 and event notifications for those publication events are provided to the user. Otherwise, the method ends.

Figure 10:
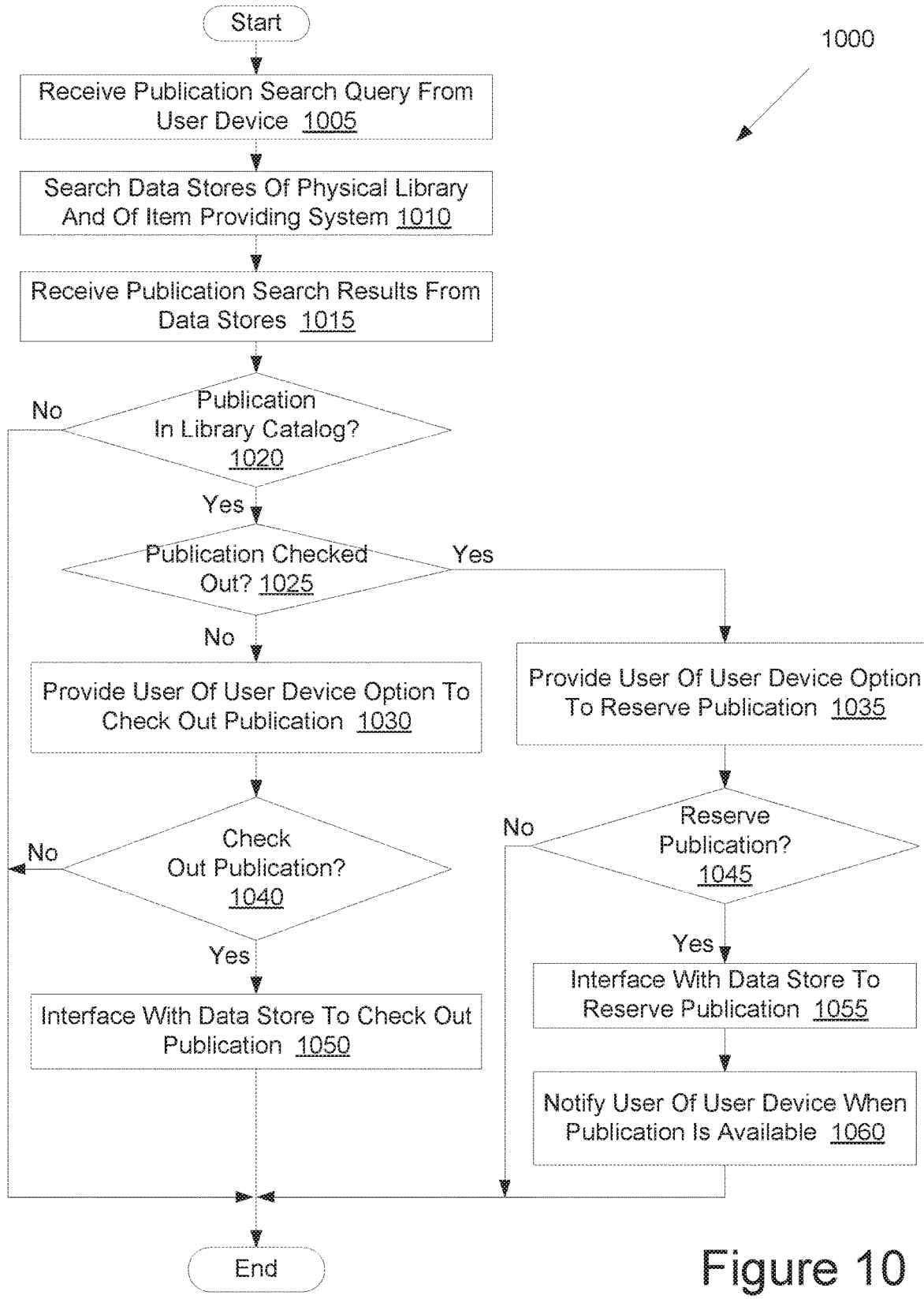
FIG. 10 is a flow diagram of one embodiment of a method for searching data stores of an item providing system and a physical library for physical and electronic versions of publications.

FIG. 10 is a flow diagram of one embodiment of a method 1000 for searching data stores of an item providing system and a physical library for physical and electronic versions of publications. The method is performed by processing logic that may comprise hardware (circuitry, dedicated logic, etc.), software (such as is run on a general purpose computer system or a dedicated machine), or a combination of both. In one embodiment, method 1000 is performed by a user device (e.g., an item consuming client 135 of user device 104 of FIG. 1). In another embodiment, method 1000 is performed by an item providing system (e.g., by item providing server 125 of item providing system 120 of FIG. 1). Alternatively, some operations of method 1000 are performed by a user device, while other operations of method 1000 are performed by an item providing system.

Referring to FIG. 10, at block 1005 of method 1000 processing logic receives a publication search query from a user device. At block 1010, processing logic searches data stores of a physical library and of an item providing system. The physical library may be a physical library that is within a threshold distance from the user device, or may be a physical library with which a user of the user device has an account. At block 1015, processing logic receives publication search results from the data stores.

At block 1020, processing logic determines whether the searched publication is in a library catalog. If the searched publication is not in a library catalog, the method ends. If the searched publication is in a library catalog, the method proceeds to block 1025. At block 1025, processing logic determines whether the publication is checked out. If the publication is not checked out, the method proceeds to block 1030. If the publication is checked out, the method proceeds to block 1035.

At block 1030, processing logic provides a user of the user device an option to check out the publication. At block 1040, processing logic determines whether the user wishes to check out the publication (e.g., whether a request to check out the publication has been received). If the user wishes to check out the publication, at block 1050 processing logic interfaces with a data store to check out the publication. Otherwise, the method ends.

At block 1035, processing logic provides a user of the user device an option to reserve the publication. At block 1045, processing logic determines whether the user wishes to reserve the publication. It may be determined that a user wishes to reserve the publication, for example, if the user has selected a reserve publication option. If the user wishes to reserve the publication, the method proceeds to block 1055. At block 1055, processing logic interfaces with a data store to reserve the publication. At block 1060, the processing logic notifies the user device when the publication is available. If at block 1045 the user does not wish to reserve the publication, the method ends.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "searching", "providing", "receiving", "determining", "identifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    sending, by a user device, a search query having a first format for an item to a first data store associated with a first entity, wherein the item comprises at least one of an electronic version or a physical version, and wherein a first server is to perform a search of the first data store using the search query having the first format;
    identifying a second data store from a plurality of additional data stores based on a predefined criterion pertaining to an association between the user device and the plurality of additional data stores;
    determining a second format to be used by search queries to the second data store;
    generating a first modified search query for the second data store, the first modified search query having the second format that is different than the first format of the search query, and wherein a second server is to perform a search of the second data store using the first modified search query having the second format;
    sending, by the user device, the first modified search query to the second data store;
    receiving item search results from the first data store and item search results from the second data store, the item search results indicating at least one of: the electronic version is available from an electronic location, the physical version is available at a physical location, or the physical location at which the physical version is available; and
    causing presentation of at least a portion of the item search results from the first data store together with at least a portion of the item search results from the second data store.

2. The method of claim 1, further comprising:
    determining, without user input, a physical location of the user device; and
    determining a distance from the physical location of the user device to the physical location of the physical version.

3. The method of claim 2, further comprising:
    determining a route between the physical location of the user device and the physical location of the physical version; and
    causing presentation of directions indicating how to navigate to the physical location of the physical version from the physical location of the user device.

4. The method of claim 2, wherein the first data store comprises a first catalog of a retailer and the second data store comprises a second catalog of the second entity, wherein the second entity is a physical library that is located within a threshold distance from the physical location of the user device.

5. The method of claim 4, further comprising:
    providing a user account associated with the user device with an option to check out the physical version from the physical library via the user device;
    receiving a request to check out the physical version; and
    performing at least one of interacting with the second data store to check out the physical version or causing the first entity to interact with the second data store to check out the physical version.

6. The method of claim 4, further comprising:
    providing a user account associated with the user device an option to reserve the physical version;
    receiving a request to reserve the physical version; and
    interacting with the second data store to reserve the physical version.

7. The method of claim 6, further comprising:
    notifying the user account when the physical version has been returned to the physical library.

8. The method of claim 1, further comprising:
    gathering information relating to user interaction with the first data store and the second data store; and
    reporting the gathered information to the first entity, wherein the first entity uses the gather information to determine what physical items to stock in a distribution warehouse.

9. The method of claim 1, wherein the item is a book and wherein the electronic version is an electronic book.

10. The method of claim 1, wherein the item comprises at least one of a magazine, an audio book, a newspaper, a journal, a newsletter, an article, or sheet music.

11. A system associated with a first entity comprising:
a first data store that comprises a catalog of items that can be obtained from the first entity;
a memory to store instructions to perform item searches; and
a processor, operatively coupled to the memory and to the first data store, to execute the instructions, wherein the instructions cause the processor to:
receive a search query having a first format for an item from a user device, wherein the item comprises at least one of an electronic version or a physical version;
search the first data store, using the search query having the first format, for the electronic version and for the physical version to generate first item search results;
identify a second data store from a plurality of additional data stores based on a predefined criterion pertaining to an association between the user device and the plurality of additional data stores;
determine a second format to be used by search queries to the second data store that comprises a catalog of items that can be obtained from a second entity;
generate a first modified search query for the second data store, the first modified search query having the second format that is different than the first format of the search query;
send the first modified search query to the second data store, wherein a second server is to perform a search of the second data store using the first modified search query having the second format;
receive second item search results from the second data store, the second item search results indicating that at least one of the electronic version or the physical version is available from the second entity; and
provide at least a portion of the first item search results from the first data store and at least a portion of the second item search results from the second data store to the user device for presentation by the user device.

12. The system of claim 11, wherein the instructions cause the processor further to:
determine a physical location of the user device;
determine a distance from physical location of the user device to a first physical location associated with the second entity; and
include the determined distance in the second item search results.

13. The system of claim 11, wherein the second data store comprises a catalog of items at a first physical location associated with the second entity that is within a predetermined distance from a physical location of the user device.

14. The system of claim 11, wherein the instructions cause the processor further to:
determine item related events that would be of interest to a user of the user device, and notify a user account associated with the user device of those item related events that would be of interest to the user and that will occur within a threshold distance from a physical location of the user device.

15. The system of claim 11, wherein the item comprises at least one of a book, an audio book, a magazine, a newspaper, a journal, a newsletter, an article, or sheet music.

16. The system of claim 15, wherein the instructions further cause the processor to:
receive a command from the user device to reserve or check out the physical version from the second entity; and
interact with a server to reserve or check out the physical version.

17. An apparatus comprising:
a memory; and
a processing device operatively coupled to the memory, the processing device to:
send a search query having a first format for an item to a first data store associated with a first entity, wherein the item comprises at least one of an electronic version or a physical version, and wherein a first server is to perform a search of the first data store using the search query having the first format;
identify a second data store from a plurality of additional data stores based on a predefined criterion pertaining to an association between the user device and the plurality of additional data stores;
determine a second format to be used by search queries to the second data store;
generate a first modified search query for the second data store, the first modified search query having the second format that is different than the first format of the search query, and wherein a second server is to perform a search of the second data store using the first modified search query having the second format;
send the first modified search query to the second data store;
receive item search results from the first data store and item search results from the second data store, the item search results indicating at least one of: the electronic version is available from an electronic location, the physical version is available at a physical location, or the physical location at which the physical version is available; and
cause presentation of at least a portion of the item search results from the first data store together with at least a portion of the item search results from the second data store.

18. The apparatus of claim 17, wherein the processing device further to:
determine, without user input, a physical location of the apparatus; and
determine a distance from the physical location of the apparatus to the physical location of the physical version.

19. The apparatus of claim 18, wherein the processing device further to:
determine a route between the physical location of the apparatus and the physical location of the physical version; and
cause presentation of directions indicating how to navigate to the physical location of the physical version from the physical location of the apparatus.

20. The apparatus of claim 18, wherein the first data store comprises a first catalog of a retailer and the second data store comprises a second catalog of the second entity, wherein the second entity is a physical library that is located within a threshold distance from the physical location of the apparatus.

* * * * *